United States Patent [19]

Sato

[11] 4,177,076

[45] Dec. 4, 1979

[54] WATER OR ALCOHOL SOLUBLE PRINTING INK COMPOSITION

[75] Inventor: Hisatake Sato, Yokohama, Japan

[73] Assignee: Nippon Oil Company, Ltd., Tokyo, Japan

[21] Appl. No.: 895,124

[22] Filed: Apr. 10, 1978

[30] Foreign Application Priority Data

Apr. 15, 1977 [JP]  Japan .................................. 52-43363
Apr. 15, 1977 [JP]  Japan .................................. 52-43364
Apr. 19, 1977 [JP]  Japan .................................. 52-44122

[51] Int. Cl.$^2$ ..................... C09D 11/00; C08F 212/08
[52] U.S. Cl. .............. 106/32; 260/29.6 TA; 260/29.6 H; 260/33.4 R; 526/272; 526/317; 526/320
[58] Field of Search ........................ 526/272, 317, 320; 260/29.6 TA, 29.6 H, 33.4 R; 106/20, 32

[56] References Cited

U.S. PATENT DOCUMENTS

| | | | |
|---|---|---|---|
| 3,655,629 | 4/1972 | Takahaya | 526/272 |
| 3,661,827 | 5/1972 | Taft | 526/317 |
| 3,764,587 | 10/1973 | Zunker | 526/317 |
| 3,887,513 | 6/1975 | Fritze et al. | 260/33.6 UA |
| 3,951,892 | 4/1976 | Drury et al. | 260/23 EM |
| 4,013,609 | 3/1977 | Hultzsch et al. | 260/33.6 UA |
| 4,028,119 | 6/1977 | Yamada et al. | 106/32 |

*Primary Examiner*—John Kight, III
*Attorney, Agent, or Firm*—Paul J. Sutton

[57] ABSTRACT

A water soluble or alcohol soluble printing ink composition comprising:

(A) 10 to 50% by weight of a resin, said resin being prepared by radical - polymerizing a mixture of (a) an unsaturated aromatic hydrocarbon, (b) a monoacrylate or monomethacrylate of a polyhydric alcohol and (c) an A,B- unsaturated carboxylic acid in the presence of an organic solvent, said resin having an acid value of 5 to 150 and a hydroxyl value of 30 to 120;

(B) 30 to 80% by weight of a solvent (C) 1 to 40% by weight of a pigment or dye.

6 Claims, No Drawings

WATER OR ALCOHOL SOLUBLE PRINTING INK COMPOSITION

BACKGROUND OF THE INVENTION

1. Field of the Invention

This invention relates to a method of preparing a resin and a coating composition containing the resin, and more particularly to a method of preparing a water and/or alcohol soulble resin and a coating composition containing such resin.

2. Prior Art

Efforts have been made to develop water and/or alcohol soluble resins, since they may be used for preparing printing inks such as water soluble gravure inks or flexo inks or coating compositions such as water or alcohol soluble paints, which are advantageous in preventing pollution problems for the reason that they cause lesser air pollution as compared to the inks and paints containing hydrocarbon solvents such as toluene. The conventionally known water soluble resins include, for example, maleic acid resins modified with rosin having high acid values and shellac, the water-proof and antifriction properties of which are, however, not satisfactory. Besides they are disadvantageous in that the costs and supply thereof are unstable since they are made from natural resources. Synthetic resins such as copolymers of styrene and acrylic acid have been developed. However, they have disadvantages in that the stability, antifriction property and water-proof property thereof are unsatisfactory when used for inks because of their high acid values. While maleic acid resins having high acid values, nitrocellulose and polyamide resins have been know as the conventional alcohol soluble resins, they are not sufficiently satisfactory because of the disadvantages in that their pigment dispersion properties are poor so that they are not conveniently used for high speed printing.

OBJECTS AND SUMMARY OF THE INVENTION

An object of this invention is to provide a process for preparing a water and/or alcohol soluble resin which has improved antifriction and water-proof properties and to provide a coating composition containing the above resin.

Another object of this invention is to provide a process for preparing a water and/or alcohol soluble resin which is stable, has good chemical affinity with pigments and gives a coated surface having superior gloss and color density when used as vehicle of a paint or printing ink, and to provide a coating composition containing the above resin.

A further object of this invention is to provide a process for preparing a water and/or alcohol soluble resin which is relatively inexpensive, and to provide a coating composition containing the above resin.

The above and other objects of the invention will become apparent with reference to the description given below.

According to the invention, a process for preparing a resin is provided which comprises radical-polymerizing a mixture of (a) an unsaturated aromatic hydrocarbon, (b) a monoacrylate or monomethacrylate of a polyhydric alcohol and (c) an $\alpha,\beta$-unsaturated carboxylic acid in the presence of an organic solvent to prepare a water and/or alcohol soluble resin having an acid value of 5 to 150 and a hydroxyl value of 30 to 120. There is also provided a coating composition containing the above resin.

DESCRIPTION OF THE INVENTION

I have found that the resin prepared by radical-copolymerizing an unsaturated aromatic hydrocarbon such as styrene, a monoacrylate or monomethacrylate of a polyhydric alcohol and an $\alpha,\beta$-unsaturated carboxylic acid such as maleic anhydride has improved properties when used as a water and/or alcohol soluble resin.

Resins prepared in accordance with the present invention have the following characteristics.

In order to obtain an alcohol soluble resin by radical-polymerizing an unsaturated aromatic hydrocarbon and a monoacrylate or monomethacrylate of a polyhydric alcohol, i.e. a monomer having good chemical affinity with alcohols, it is required to use a large amount of the monoacrylate or monomethacrylate. Nevertheless, when an $\alpha,\beta$-unsaturated carboxylic acid such as acrylic acid or maleic anhydride is added thereto to prepare a ternary copolymer, the amount of the monoacrylate or monomethacrylate of a polyhydric alcohol may be considerably decreased, thus making it possible to prepare the resin at low costs. In addition, the resin has an appropriate acid value to give improved affinity with pigments and to give a coated film or a printed surface having superior gloss and color density when used for various coating composition such as inks and paints.

In order to render a resin composed of a binary system consisting of an unsaturated aromatic hydrocarbon and an $\alpha,\beta$-unsaturated carboxylic acid, for example consisting of styrene and acrylic acid, to be soluble in water with the use of an aqueous alkali solution, it is essential that the resin has an acid value of about 200. Because of its high acid value, such resin can only give a coating having insufficient water-proof and antifriction properties. In accordance with the present invention, a monoacrylate or monomethacrylate of a polyhydric alcohol is added to the system composed of, for example, styrene and acrylic acid for copolymerizing same to obtain a ternary copolymer which may readily be water soluble with the use of an aqueous solution of an alkali irrespective of whether it has a small acid value and which gives a coated surface having considerably improved water-proof and antifriction properties and a good gloss when used as a resinous ingredient in various coating compositions such as paints, printing inks or the like.

An acid value of the resin prepared by the process of the present invention ranges from 5 to 150, and a hydroxyl value thereof ranges from 30 to 120. When used as an alcohol soluble resin, the resin may have an acid value ranging generally from 5 to 80, preferably from 10 to 60, and a hydroxyl value ranging generally from 30 to 100, preferably from 40 to 80; and when used as a water soluble resin, it may have an acid value ranging generally from 60 to 150, preferably from 70 to 120, and a hydroxyl value ranging generally from 30 to 120, preferably from 40 to 100.

The hydroxyl value is measured by the acetic anhydride-pyridine method by Ogg, Porter and willits (Ind. Eng. Chem., Anal. Ed., vol. 17, pages 394 (1945)) and represented by the amount of the consumed KOH in milligram which corresponds to the amount of hydroxyl groups contained in 1 g of the resin. The acid value is measured in accordance with Japanese Industrial Standard (hereinafter referred to as JIS) K-5902.

If the acid value of the alcohol soluble resin is less than 5, the affinity between the resin and the pigments is not sufficient to result in poor gloss and color density of the coated surface. On the other hand, if the acid value is more than 80, the pigment dispersion property and the stability with the lapse of time of the coating composition containing the resin are deteriorated. If the hydroxyl value of the resin is less than 30, it becomes insoluble in alcohols such as isopropyl alcohol. Even if the hydroxyl value of the resin is increased more than 100, the gloss and color density of the coated surface containing the resin is not improved so far. In view of the undesirable increase in cost, it is preferred to maintain the hydroxyl values less than 100.

When used as a water soluble resin, if the acid value thereof is less than 60, it is insoluble in an aqueous solution of an alkali, and if the acid value exceeds 150, the water-proof property of the coating containing the same becomes poor. If the hydroxyl value decreases less than 30, even the one having the acid value of 150 can not be dissolved in an aqueous alkali. Even if the hydroxyl value of the resin is increased more than 120, the gloss and color density of the coated surface containing the resin is not improved so far, hence it is not advisable to increase the hydroxyl value so higher in view of the accompanying increase in production cost, the preferable value being less than 120.

Examples of the unsaturated aromatic hydrocarbons which may be used in the present invention include styrene, vinyltoluene, $\alpha$-methylstyrene and a fraction of distillate of cracked naphtha which has the boiling temperature of 140° to 220° C. and which contains styrene, indene and derivatives thereof.

Monoacrylates and monomethacrylates which may be used in the present invention are monoesters prepared from acrylic or methacrylic acid and polyhydric alcohols. The polyhydric alcohols include those having generally 2 to 10 carbon atoms and preferably 2 to 5 carbon atoms, the typical examples being ethylene glycol, propylene glycol, butanediol, glycerol, pentaerythritol, diethylene glycol, dipropylene glycol and triethylene glycol. Monoacrylates and monomethacrylates of polyhydric alcohols used in the present invention, therefore, include 2-hydroxyethyl acrylate, 2-hydroxyethyl methacryalte, 2-hydroxypropyl acrylate, 2-hydroxypropyl acrylate, 2-hydroxypropyl methacrylate, diethyleneglycol monoacrylate and diethyleneglycol monomethacrylate.

The $\alpha,\beta$-unsaturated carboxylic acid herein referred to is intended to include $\alpha,\beta$-unsaturated dicarboxylic acids and anhydrides thereof. Examples of $\alpha,\beta$-unsaturated carboxylic acid are maleic anhydride, itaconic anhydride, acrylic acid and methacrylic acid.

The organic solvents used in the polymerization reaction are those which do not induce any undesirable reaction and include hydrocarbon solvents such as benzene, toluene, xylene, cumene, cymene, isooctane, mineral sprit, solvent naphtha and kerosene; alcohols such as methanol, ethanol, n-propanol, isopropyl alcohol, n-butanol, sec-butanol, n-amyl alcohol and 2-ethylhexyl alcohol; and glycol ethers such as butyl cellosolve and ethyl cellosolve.

Depending upon the temperature used, a suitable catalyst may be selected from the so-called radical polymerization catalysts which generate radicals. Examples of the catalysts are benzoil peroxide, lauroyl peroxide, di-tert-butyl peroxide, tert-butyl hydroperoxide, cumene hydroperoxide, paramenthane hydroperoxide, tert-butyl perbenzoate, tert-butyl peracetate and azobis-isobutyronitrile, one or more of which are properly selected depending upon the temperature used. The amount of the catalysts to be added is generally 0.3 to 5% by weight, preferably 0.5 to 3% by weight, of the total amount of the used monomers. The polymerization time is in the range of from 0.5 to 10 hours, preferably from 1 to 5 hours.

An adequate molecular weight adjuster selected from the known chain transferring agents commonly used in radical polymerization, may be used in the process of the present invention for adjusting the softening point of the resin. The molecular weight adjusters include mercaptans, halogenated hydrocarbons, halogen substituted organic acids, aldehydes and alcohols, and the specific examples being n-dodecylmercaptan, tert-dodecylmercaptan, octylmercaptan, butylmercaptan, carbon tetrabromide, bromoacetic acid, butyl aldehyde and octyl alcohol.

A mixture containing an unsaturated aromatic hydrocarbon, a monoacrylate or monomethacrylate of a polyhydric alcohol, an $\alpha,\beta$-unsaturated carboxylic acid, a solvent and a radical-polymerization initiator is kept at a predetermined temperature for a predetermined period to polymerize. Alternatively, polymerization may be effected by adding dropwise a mixture of an unsaturated aromatic hydrocarbon, a monoacrylate or monomethacrylate of a polyhydric alcohol, an $\alpha,\beta$-unsaturated carboxylic acid, a solvent and a radical-polymerization initiator to a solvent kept at a predetermined temperature.

In the process of the present invention, monomers may be converted to polymers at the convertion ratio of substantially 100% by selecting a proper reaction condition so that a resin having a desired acid value and hydroxyl value may be prepared only by theoretically determining the feed amounts of the starting materials for obtaining the resin having the predetermined acid and hydroxyl values. For example, when an alcohol is used as the solvent for the polymerization, a resin solution in alcohol may be directly obtained and the step of recovering the resin from the solution after the polymerization step may be dispensed with. It is, therefore, possible to use the reaction mixture immediately after polymerization as a paint or printing ink varnish dissolved in alcohol, when an alcohol is used as the solvent in the polymerization reaction. If it is desired to recover a solid resin from the reaction mixture containing the resin after polymerization, it is preferred to remove the solvent by a distillation or evaporation operation from the industrial standpoint of view. In the present invention, the temperature at which distillation or evaporation is effected is an important factor, and the distillation or evaporation temperature should be kept generally lower than 230° C., preferably lower than 210° C. If the distillation or evaporation temperature exceeds 230° C., there is a danger that the resin gelatinizes occasionally and becomes insoluble in an alcohol or an aqueous solution of an alkali.

The resins produced in accordance with the process described above have, in general, the softening point (measured in accordance with JIS-K-2531-60) of 100° to 150° C., the number average molecular weights of 800 to 5000, and the hues (measured in accordance with ASTM D-1544-58T, Gardner Scale, Resin content: 100%) of less than 7.

The water and/or alcohol soluble resins of the present invention may be dissolved in an alcohol, a mixed solvent of alcohol aqueous solution of an alkali or an aqueous solution of an alkali to give varnishes. These varnishes may be mixed with any pigments to produce various coating compositions. Usable alcohols include generally those having 1 to 10 carbon atoms, preferably those having 2 to 6 carbon atoms, the typical examples being ethanol, isopropyl alcohol, ethyl cellosolve and the mixtures thereof. As described above, alcohols used as the solvents in the polymerization reaction may be left unremoved and may be used for the solvents for the varnishes.

The alkalis which are used for neutralizing the resins to make them soluble in aqueous alkali solutions, include ammonia, dimethylamine, trimethylamine, monoethanolamine, diethanolamine, triethanolamine and morpholine.

The water soluble printing ink compositions of the present invention may be prepared, for example, by mixing respective components as follows:

| Resin of the Invention | 10–50 wt. % |
|---|---|
| Solvent (Aqueous Alkali Solution) | 30–80 wt. % |
| Pigment or Dye (Coloring Agent) | 1–40 wt. % |
| Extender Pigment | 0–10 wt. % |
| Addition Materials such as Plasticizer and Wax | 0–10 wt. % |

Typical examples of the pigments include those which are commonly used for coloring inks and suitable for use as a water soluble ink, such as Cyanine Blue, Lithol Red, Fast Red, Chrome Yellow and carbon black.

The alcohol soluble printing ink compositions of the present invention may be prepared, for example, by mixing respective components as follows:

| Resin of the Invention | 10–50 wt. % |
|---|---|
| Solvent (Alcohol) | 30–80 wt. % |
| Extender Pigment | 0–20 wt. % |
| Pigment or Dye (Coloring Agent) | 1–40 wt. % |
| Addition Materials such as Plasticizer, Plastic Resin, Wax and Dispersing Agent | 0–15 wt. % |

Typical examples of the pigments include those which are commonly used for coloring inks, such as Cyanine Blue, Carmin 6B, Benzidine Yellow and carbon black.

A composition which is prepared by decreasing the amount of any of the components, for example the solvent, may be supplied to the market for being added with the decreased components to adjust the composition by users for practical use.

The printing ink compositions of the present invention are stable, give coated surface of excellent gloss and color density and exert superior characteristics for the flexo inks or gravure printing inks. The water soluble printing ink compositions of the present invention may be used together with a maleic acid resin modified with rosin, a water soluble acrylic resin or an alkyd resin. Similarly, the alcohol soluble printing ink compositions of the present invention may be used together with an alcohol soluble resin such as nitrocellulose or a polyamide resin.

EXAMPLE OF THE INVENTION

The present invention will be further described in detail with reference to examples thereof.

EXAMPLE 1

Into a four-necked flask of 300 ml in volume and provided with a reflux condenser, a thermometer, an agitator and a dropping funnel was put 50 g of p-cymene which was preliminarily kept at 170° C. A mixture of 50 g of styrene, 9 g of 2-hydroxyethyl methacrylate, 4 g of acrylic acid, 1 g of di-tert-butyl peroxide, 0.5 g of tert-dodecylmercaptan and 50 g of p-cymene was added dropwise to p-cymene kept at 160° C. through a dropping funnel over a period of 1 hour. After agitating the reaction mixture for additional 2 hours at the same temperature, the solvent and oligomers were removed at 200° C. under the reduced pressure of 5 mmHg abs. to obtain 56.6 g of a resin. The resin had a softening point of 126° C., an acid value of 46, a hydroxyl value of 47 and a hue of 2, and was soluble in ethanol and isopropyl alcohol.

EXAMPLE 2

Into a four-necked flask of 300 ml in volume and provided with a reflux condenser, a thermometer, an agitator and a dropping funnel were put 50 g of vinyltoluene, 15 g of 2-hydroxypropyl methacrylate, 1 g of acrylic acid, 0.3 g of n-dodecylmercaptan, 50 g of isopropyl alcohol and 1.5 g of azo-bis-isobutyronitrile, and the mixture was continuously agitated at 70° C. for 2 hours after replacing air in the system with $N_2$. Then, the temperature was raised to 75° C. and the mixture was agitated for further 3 hours. Therefore, the solution was allowed to stand to be cooled to the room temperature. The solid content of the resultant solution was 54.3% by weight, and the solution was partially miscible with ethanol, and miscible with a mixture of ethanol and isopropyl alcohol (1:1) and with isopropyl alcohol. A resin obtained by distilling the solution similarly as in Example 1 had a softening point of 130° C., an acid value of 9 and a hydroxyl value of 78.

EXAMPLE 3

Into the same flask as used in Example 2, were put 100 g of a cracked oil fraction which had been obtained as a by-product of the steam-cracked product of naphtha and which had the boiling point ranging from 145° to 176° C. (Total amount of the unsaturated components measured by gas chromatography was 46.5% by weight.), 12 g of 2-hydroxyethyl methacrylate, 1 g of methacrylic acid, 0.5 g of octylmercaptan and 1 g of di-tert-butyl peroxide. Air in the system was replaced with $N_2$, and the reaction mixture was then agitated at 125° C. for 3 hours and further at 145° C. for additional 1 hour. The solvent and oligomers were removed at 210° C. under the reduced pressure of 5 mmHg abs. to obtain 55.3 g of a resin. The resin had a softening point of 138° C., an acid value of 13, a hydroxyl value of 74 and a hue of 5; and it was partially soluble in ethanol and soluble in a mixture of ethanol and isopropyl alcohol (1:1) and in isopropyl alcohol.

EXAMPLE 4

A mixture composed of 100 g of the cracked oil fraction having the boiling point of from 145° to 176° C. as used in Example 3, 10 g of 2-hydroxyethyl methacrylate, 1.5 g of maleic anhydride and 1 g of benzoil peroxide was dropwise added to 50 g of xylene kept at 135° to 140° C. over a period of 2 hours, and then unreacted components and oligomers were removed similarly as in Example 3 to obtain 53 g of a resin. The resin had a softening point of 132° C., an acid value of 18, a hydroxyl value of 52 and a hue of 5; and it was partially soluble in ethanol and soluble in a mixture of ethanol and isopropyl alcohol (1:1) and in isopropyl alcohol.

COMPARATIVE EXAMPLE 1

Following to a similar procedure as in Example 1, a mixture composed of 50 g of styrene, 15 g of 2-hydroxyethyl acrylate, 0.5 g of tert-dodecylmercaptan, 1 g of di-tert-butyl peroxide and 50 g of p-cymene was added to 50 g of p-cymene kept at 170° C., and thereafter the solvent and oligomers were removed to obtain 59 g of a resin which had a softening point of 128° C., an acid value of less than 1, a hydroxyl value of 82. The resin was insoluble both in ethanol and isopropyl alcohol.

COMPARATIVE EXAMPLE 2

Following to a similar procedure as in Comparative Example 1, 63.4 g of a resin was prepared from 50 g of styrene, 20 g of 2-hydroxyethyl methacrylate, 50 g of p-cymene, 1 g of n-dodecylmercaptan and 1.5 g of di-tert-butyl peroxide. The resin had a softening point of 136° C., an acid value of less than 1 and a hydroxyl value of 98; and it was not soluble both in a mixture of ethanol and isopropyl alcohol (1:1) and in isopropyl aocohol.

COMPARATIVE EXAMPLE 3

Following to a similar procedure as in Comparative Example 1, 73.4 g of a resin was prepared from 50 g of styrene, 30 g of 2-hydroxyethyl methacrylate, 50 g of p-cymene, 1 g of n-dodecylmercaptan and 1.5 g of di-tert-butyl peroxide. The resin had a softening point of 136° C., an acid value of less than 1 and a hydroxyl value of 153; and it was soluble in a mixture of ethanol and isopropyl alcohol (1:1) and in isopropyl alcohol.

EXAMPLE 5

Into the same apparatus as used in Example 1, was put 100 g of p-cymene which was preliminarily kept at 160° C., to which a mixture of 50 g of styrene, 10 g of 2-hydroxyethyl acrylate, 13 g of acrylic acid, 2 g of n-dodecylmercaptan, 50 g of p-cymene and 1 g of di-tert-butyl peroxide was dropwise added over a period of 2 hours, and then the solvent and oligomers were removed at 190° C. under the reduced pressure of 5 mmHg to obtain 69 g of a resin. The resin had a softening point of 133° C., an acid value of 95, a hydroxyl value of 44 and a hue of 3. This resin was soluble in isopropyl alcohol. Mixing the resin with the equal equivalent of aqueous ammonia and water to prepare an aqueous solution thereof having a resin content of 30% by weight. The viscosity at 25° C. of the thus prepared aqueous solution was 110 cps.

EXAMPLE 6

Following to a similar procedure as in Example 5, a mixture of 20 g of 2-hydroxyethyl acrylate, 10 g of methacrylic acid, 2 g of n-dodecylmercaptan, 5 g of p-cymene and 1 g of di-tert-butyl peroxide was dropwise added to 100 g of p-cymene heated to 160° C. through a dropping funnel over a period of 2 hours, and then the reaction mixture was subjected to the operational steps generally similar as in Example 5 to obtain 72 g of a resin which had a softening point of 126° C., an acid value of 82, a hydroxyl value of 94 and a hue of 3. A solution in aqueous ammonia prepared similarly as in Example 5 had a viscosity of 230 cps.

EXAMPLE 7

To 100 g of the same cracked oil fraction as used in Example 3, was added a mixture of 15 g of 2-hydroxyethyl acrylate, 15 g of acrylic acid, 1.5 g of n-dodecylmercaptan, 1.5 g of benzoil peroxide and 50 g of xylene through a dropping funnel over a period of 2 hours, and then the reaction mixture was subjected to the operational steps generally similar as in Example 6 to obtain 68 g of a resin. The resin had a softening point of 141° C., an acid value of 112, a hydroxyl value of 64 and a hue of 5. An aqueous ammonia solution prepared similarly as in Example 5 had a viscosity of 125 cps.

EXAMPLES 8-11 & COMPARATIVE EXAMPLES 4 AND 5

Varnishes were prepared by dissolving 50 g each of the resins obtained, respectively, in Examples 1, 3 and 4 and Comparative Examples 1 and 3 in 50 g each of a mixed solvent of isopropyl alcohol: ethanol (1:1). Also, the solid content of the solution obtained in Example 2 was adjusted to have the value of 50% by weight using the same mixed solvent. The viscosities at 25° C. of respective varnishes were measured. 5 parts by weight of Carmin 6B and 45 parts by weight of the mixed solvent were added to 50 parts by weight of each of the above varnishes and mixed together in a ball mill to prepare inks. The thus prepared inks were extended on coated paper and a polyester film using a barcoater, and the gloss and color density of each of the coated surfaces were visually observed. Results of the tests are shown in Table 1.

Table 1

|  |  | Ex. 8 | Ex. 9 | Ex. 10 | Ex. 11 | COm. Ex. 4 | Com. Ex. 5 |
| --- | --- | --- | --- | --- | --- | --- | --- |
| Resin Used |  | Ex. 1 | Ex. 2 | Ex. 3 | Ex. 4 | Com. Ex. 1 | Com. Ex. 3 |
| Viscosity of Varnish (cps) |  | 340 | 410 | 315 | 270 | Not Measurable | 370 |
| Coated Paper | Gloss | good | good | good | good | — | poor |
|  | Color Density | good | good | good | good | — | poor |
| Polyester Film | Gloss | good | good | good | good | — | poor |
|  | Color Density | good | good | good | good | — | poor |
| Stability with the |  |  |  |  |  |  |  |

Table 1-continued

|  | Ex. 8 | Ex. 9 | Ex. 10 | Ex. 11 | Com. Ex. 4 | Com. Ex. 5 |
|---|---|---|---|---|---|---|
| Lapse of Time | good | good | good | good | — | good |

(Note)
Stability with the Lapse of Time: Respective inks were allowed to stand for one month at room temperature and those, the viscosities of which were not changed substantially, were evaluated as good.
Gloss & Color Density: The gloss and the color density of the coated surface were visually observed and evaluated.

EXAMPLE 12

Into a four-necked flask of 300 ml in volume and provided with a reflux condenser, a thermometer, an agitator and a dropping funnel was put 100 g of p-cymene which was preliminarily kept at 160° C., to which a mixture composed of 50 g of styrene, 10 g of 2-hydroxyethyl acrylate, 13 g of acrylic acid, 2 g of n-dodecylmercaptan, 50 g of p-cymene and 1 g of di-tert-butyl peroxide was dropwise added over a period of 2 hours. Thereafter the solvent and oligomers were removed at 190° C. under the reduced pressure of 5 mmHg to obtain 69 g of a resin. The resin had a softening point of 133° C., an acid value of 95, a hydroxyl value of 44 and a hue of 3. Mixing the resin with the equal equivalent of aqueous ammonia and water to prepare an aqueous solution thereof having a resin content of 30% by weight. The viscosity at 25° C. of the thus prepared aqueous solution was 110 cps.

EXAMPLE 13

Following to a similar procedure as in Example 12, a mixture composed of 20 g of 2-hydroxyethyl methacrylate, 10 g of methacrylic acid, 2 g of n-dodecylmercaptan, 5 g of p-cymene and 1 g of di-tert-butyl peroxide was dropwise added to 100 g of p-cymene heated to 160° C. over a period of 2 hours. The reaction mixture was then treated similarly as in Example 12 to obtain 72 g of a resin. The resin had a softening point of 126° C., an acid value of 82, a hydroxyl value of 94 and a hue of 3, and the viscosity of a solution prepared similarly as in Example 12 was 230 cps.

EXAMPLE 14

A mixture composed of 15 g of 2-hydroxypropyl acrylate, 15 g of acrylic acid, 1.5 g of n-dodecylmercaptan, 1.5 g of benzoil peroxide and 50 g of xylene was dropwise added to 100 g of a cracked oil fraction which had been obtained as a by-product of the steam-cracking of naphtha and which had the boiling point ranging from 145° to 176° C. (Total amount of the unsaturated components measured by gas chromatography was 46.5% by weight, and it contained, as the main ingredients, about 1% by weight of styrene, about 8% by weight of methylstyrenes, about 34% by weight of vinyltoluene and about 2% by weight of indene.) through a dropping funnel over a period of 2 hours. Following procedures were similar as in Example 12 to obtain 68 g of a resin. The resin had a softening point of 141° C., an acid value of 112, a hydroxyl value of 64 and a hue of 5, and the viscosity of a solution prepared similarly as in Example 12 was 125 cps.

COMPARATIVE EXAMPLE 6

Into the same apparatus as used in Example 12, was put 100 g of p-cymene which was preliminarily kept at 160° C., to which 50 g of styrene, 25 g of acrylic acid, 3 g of n-dodecylmercaptan, 150 g of p-cymene and 1.5 g of di-tert-butyl peroxide were dropwise added over a period of 2 hours. Following procedures were similar as in Example 12 to obtain 72 g of a resin. The resin had a softening point of 145° C. and an acid value of 193, and the viscosity of a solution prepared similarly as in Example 12 was 140 cps.

COMPARATIVE EXAMPLE 7

Into the same apparatus as used in Example 12 was put 50 g of p-cymene which was preliminarily kept at 170° C., to which a mixture of 50 g of styrene, 15 g of 2-hydroxyethyl acrylate, 0.5 g of tert-dodecylmercaptan, 1 g of di-tert-butyl peroxide and 50 g of p-cymene was dropwise added, and then the solvent and oligomers were removed to obtain 59 g of a resin. The resin had a softening point of 128° C., and acid value of less than 1 and a hydroxyl value of 82. However, it was not soluble in the aqueous alkali prepared similarly as in Example 12, and thus a varnish could not be produced therefrom.

EXAMPLES 15-17 & COMPARATIVE EXAMPLES 8 AND 9

Inks were prepared by mixing 50 g each of the varnishes obtained, respectively, in Examples 12 to 14 and Comparative Examples 6 and 7 with 8 g of Cyanine Blue and 30 g of water in a ball mill. These inks were extended on coated paper using a barcoater. The results are shown in Table 2.

Table 2

|  | Ex. 15 | Ex. 16 | Ex. 17 | Com. Ex. 8 | Com. Ex. 9 |
|---|---|---|---|---|---|
| Resin Used | Ex. 12 | Ex. 13 | Ex. 14 | Com. Ex. 6 | Com. Ex. 7 |
| Stability with the Lapse of Time | good | good | good | rather poor | — |
| Gloss & Color Density | good | good | good | good | — |
| Water Proof Property | good | good | good | poor | — |

(Note) Water Proof Property: The surfaces coated with respective inks were rubbed with a bleached cotton cloth wetted with water while applying a loading of 450 g using a Sutherland rub-tester, and those, from which substantially no transferring of the inks were observed, were evaluated as good.

What is claimed is:
1. A water soluble or alcohol soluble printing ink composition comprising:
(A) 10 to 50% by weight of a resin, said resin being prepared by radical-polymerizing a mixture consisting essentially of (a) an unsaturated aromatic hydrocarbon, (b) a monoacrylate or monomethacrylate of a polyhydric alcohol and (c) an $\alpha,\beta$-unsaturated carboxylic acid in the presence of an organic solvent, said resin having an acid value of 5 to 150 and a hydroxyl value of 30 to 120;
(B) 30 to 80% by weight of a solvent selected from the group consisting of an alcohol having 1 to 10 carbon atoms, a mixed solvent of alcohol aqueous solution of an alkali and an aqueous solution of an alkali; and
(c) 1 to 40% by weight of a pigment or die.

2. A water soluble printing ink composition according to claim 1, wherein said resin had an acid value of 60 to 150.

3. An alcohol soluble printing ink composition according to claim 1, wherein said resin has an acid value of 5 to 80 and a hydroxyl value of 30 to 100.

4. A water soluble or alcohol soluble printing ink composition according to claim 1, 2 or 3, wherein said unsaturated aromatic hydrocarbon is selected from the group consisting of styrene, vinyltoluene, α-methylstyrene and a cracked oil fraction of naphtha which has a boiling point of 140° to 220° C. and which contains styrene, indene and derivatives thereof.

5. A water soluble or alcohol soluble printing ink composition according to claim 1, 2 or 3, wherein said monoacrylate or monomethacrylate is a monoester prepared from acrylic or methacrylic acid and a polyhydric alcohol selected from the group consisting of ethylene glycol, propylene glycol, butanediol, glycerol, pentaerythritol, diethylene glycol, dipropylene glycol and triethylene glycol.

6. A water soluble or alcohol soluble printing ink composition according to claim 1, 2 or 3, wherein said α,β-unsaturated carboxylic acid is selected from the group consisting of maleic anhydride, itaconic anhydride, acrylic acid, and methacrylic acid.

* * * * *